United States Patent [19]

Raskin

[11] 4,385,527
[45] May 31, 1983

[54] AIRCRAFT WEIGHING SYSTEMS

[76] Inventor: Seymour H. Raskin, 7333 Rustic Valley Dr., Dallas, Tex. 75248

[21] Appl. No.: 283,525

[22] Filed: Jul. 15, 1981

Related U.S. Application Data

[63] Continuation of Ser. No. 37,134, May 8, 1979, abandoned.

[51] Int. Cl.³ .......................... G01L 1/22; G01L 5/16
[52] U.S. Cl. .......................... 73/862.04; 73/862.54; 73/862.65; 177/146
[58] Field of Search .......... 73/862.04, 862.65, 862.67, 73/862.54; 177/146

[56] References Cited

U.S. PATENT DOCUMENTS

| | | | |
|---|---|---|---|
| 2,488,347 | 11/1949 | Thurston | 73/862.67 |
| 2,754,107 | 7/1956 | Ernst et al. | 177/146 X |
| 2,806,686 | 9/1957 | Miller, Jr. | 177/146 |
| 2,859,613 | 11/1958 | Green | 73/862.65 X |
| 3,023,627 | 3/1962 | Geyling | 73/862.04 X |
| 3,439,761 | 4/1969 | Laimins | 177/211 |
| 3,837,222 | 9/1974 | Raskin | 73/862.65 X |
| 4,071,838 | 1/1978 | Block | 338/5 |

FOREIGN PATENT DOCUMENTS

| | | | |
|---|---|---|---|
| 2129214 | 1/1973 | Fed. Rep. of Germany | 73/862.65 |
| 446758 | 3/1968 | Switzerland | 73/862.65 |
| 974519 | 11/1964 | United Kingdom | 73/862.65 |

*Primary Examiner*—Charles A. Ruehl
*Attorney, Agent, or Firm*—Gerald G. Crutsinger; John F. Booth; Monty L. Ross

[57] ABSTRACT

An aircraft weighing system which includes substantially rectangular operator members (10) associated with jacks to support an aircraft (100). The operator member (10) includes a pair of central bearing beam members (51, 52) secured to opposite ends of a rigid load receiving member (53). The central bearing beam members (51, 52) are supported by side bearing beam members (31, 32, 41, 42) through rigid end members (63, 64) to maintain an angular relationship between ends of the beam members (31, 32, 41, 42, 51, 52) when loading is changed such that deflection of the beam members indicates the weight of the aircraft.

4 Claims, 11 Drawing Figures

AIRCRAFT WEIGHING SYSTEMS

This application is a continuation of application Ser. No. 37,134, filed May 8, 1979, now abandoned.

BACKGROUND

This invention relates to a device for measuring force acting parallel to one selected axis, wherein the device is substantially insensitive to force vectors acting in any directions which are not parallel to the selected axis.

More specifically, this invention provides load-sensitive operator members, each of which operator members have a flexure beam portion, yet all the externally applied load forces and support forces are isolated from the flexure beam support.

Moreover, the simple construction of the device provides for assembly by means of welding, if desired, where all welds to either provide support of the load receiving member or to fix supporting structure to a rigid base are far removed from the neutral axis of the flexural members.

Finally, the structure of this device is arranged so that the flexural members are subjected to bending stresses proportional to the applied load, but torsional stresses are minimized. The device relates to improvements in devices of the type disclosed in U.S. Pat. No. 3,837,222.

The teaching of U.S. Pat. No. 3,837,222 recognizes that the welded attachment of a support block or support post to a planar flexure beam of uniform cross section rigidifies the beam member against bending along the length of attachment. Said patent further teaches that the relationship between rigidity of the beam member and rigidity of laterally disposed bearing members is critical. Welded attachment of the support post is made as close to the neutral axis as practical, in order to minimize extraneous forces which may be imposed by action of the welds on a deflecting planar beam member.

The present invention provides for all welds to be located on portions of the variable thickness that are so rigidified and are so far removed from potential areas of influence on bending of the neutral axis that extraneous forces imposed by the welds will act only in areas where substantially no flexure is occurring due to the force being measured.

Finally, the present invention provides for support of the side bearing members of the operator member in a manner that eliminates introduction of tensional forces into the side members by the supporting base.

BRIEF DESCRIPTION OF THE DRAWINGS

Other objects and advantages of the invention will become apparent upon reading the following detailed description and upon reference to the drawings, wherein like reference characters are used throughout to designate like parts.

DESCRIPTION OF A PREFERRED EMBODIMENT

Figure 1:
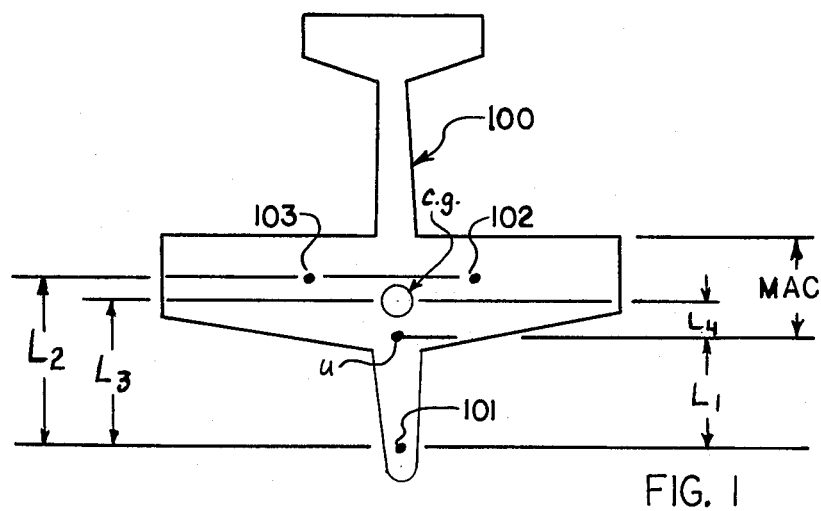
FIG. 1 is a plan view of an airplane supported by a load cell assemblies constructed according to the present invention.

Now referring to the drawings, FIG. 1 shows a plan view of airplane 100 having three predetermined weighing points 101, 102 and 103. The fore-and-aft locations of the weighing points relative to each other are constant by design. The location of the center of gravity c.g. may vary as a result of manufacturing variables during production of the airplane or, more significantly, as a result of field modifications and variations in loading during service life of the airplane.

The distance $L_1$ between weighing point 101 and point u, however, is known by design. Point u is the leading edge of the mean aerodynamic chord MAC. Fore-and-aft distance $L_2$ between weighing points 102, 103 and weighing point 101 is also known by design.

Any unknown distance $L_3$ between weighing point 101 and the center of gravity c.g. can be determined by calculation, if the weight force acting at point 101 and the sum of the weight forces acting at points 102 and 103 are known. By further calculation, the distance $L_4$ between point u and center of gravity c.g. can be determined as the difference between distance $L_3$ minus distance $L_1$. The length of mean aerodynamic chord MAC is known by design, so that the location of the center of gravity c.g. can be calculated in traditional terms of percent MAC, expressed by $(L_4 \div MAC)(100)$.

The sum of weight forces acting at weighing points 101, 102 and 103 is equal to the gross weight of airplane 100.

Figure 2:
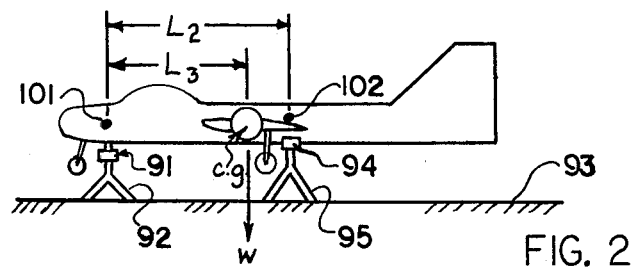
FIG. 2 is an elevational view of the structure shown in FIG. 1.
Figure 3:
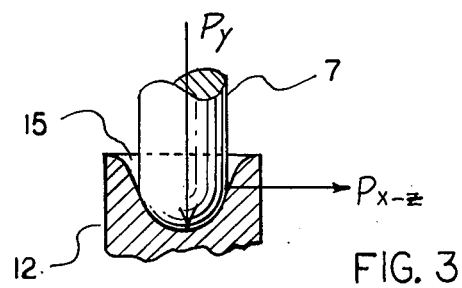
FIG. 3 is an illustration of a load directed onto a support post from the airplane shown in FIG. 1.

In FIG. 2, a load cell assembly 91 is mounted on a jack 92 which rests on the ground or floor shown as surface 93. Load cell 91 measures the vertical weight force acting at point 101 of the airplane 100. The combination of load cell 94 and jack 95 enables measurement of the weight force acting at weighing point 102. Similarly, a third load cell and jack, neither of which is visible in this view, enable measurement of the weight force acting at weighing point 103.

The common method of introducing weight force into each of the load cells utilizes a typical jack point 7 mounted on the airplane 100. One jack point 7 is provided on the airplane at each of weighing points 101, 102 and 103. The hemispherical lower end of jack point 7 engages the recessed socket portion 15 of support post 12 which is attached to a load cell assembly (not shown). Vertical weight force Py needs to be sensed and measured, but some horizontal force $P_{x-z}$ may be introduced as a result of misalignment of the jacks and/or residual friction forces caused by temporary tilting of the airplane during the process of jacking it to a raised and level position.

The device of FIGS. 4 through 7 shows an embodiment of the invention in the form of a typical load cell 91, which is sensitive to forces acting along or parallel to preselected axes of the device.

The load cell 91 comprises an operator member 10, a base member 11 and a support post 12. Base member 11 is provided with a mounting adapter portion 13 for attachment to the top of a jack by means of internal threads 14. Support post 12 is welded to operator member 10, as shown by typical welds 18 in FIG. 6. Operator member 10 is welded to base member 11, as shown by typical welds 18 in FIG. 5, which figure also shows the welds 18 connecting adapter portion 13 to base 12.

Figure 4:
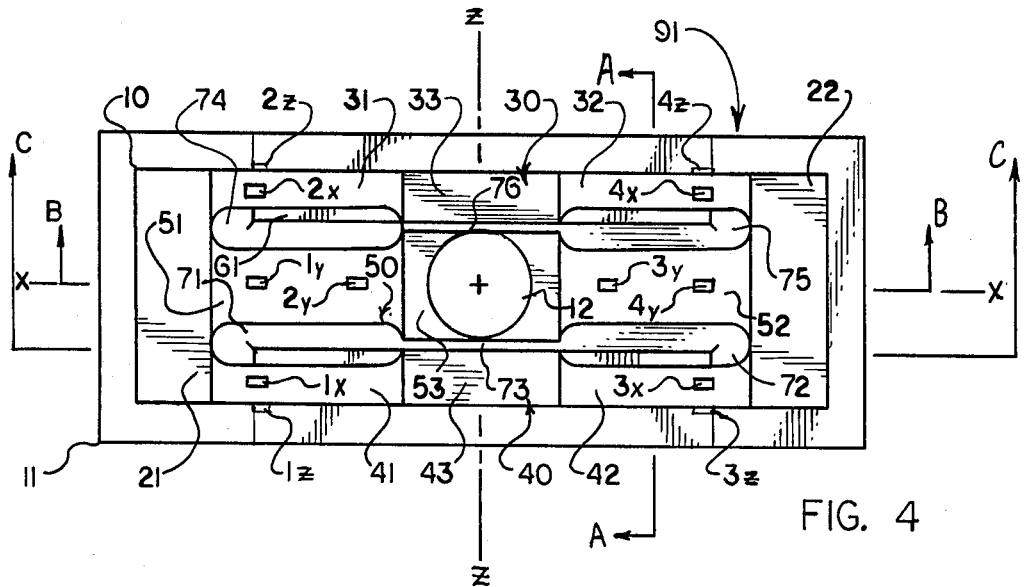
FIG. 4 is a plan view of an embodiment of a load cell constructed according to the present invention.

Three independent sets of strain gages are attached to operator member 10, as shown in FIG. 4. As will be described later, one set, comprising strain gages 1y, 2y, 3y and 4y, is used for measuring any force Py acting along or parallel to axis y—y. Another set, comprising strain gages 1x, 2x, 3x and 4x, is used for measuring any force Px acting along or parallel to axis x—x. A third set, comprising strain gages 1z, 2z, 3z and 4z, is used for measuring any force Pz acting along or parallel to axis z—z.

Figure 6:
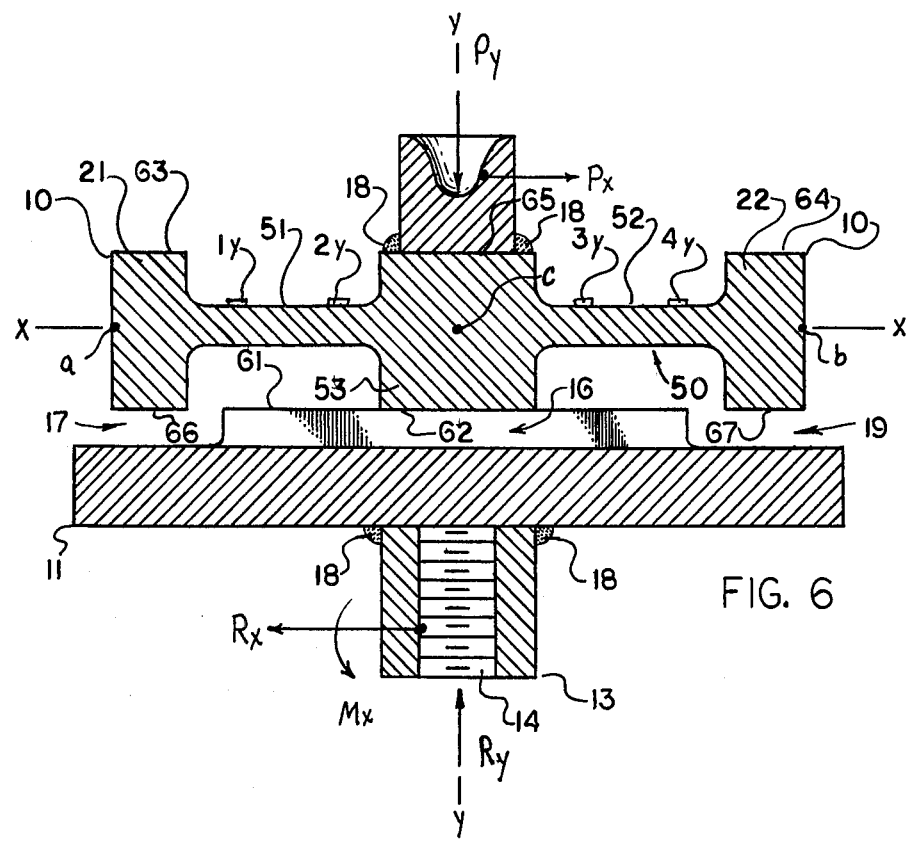
FIG. 6 is a cross-sectional view of the embodiment shown in FIG. 4 taken in the direction of arrows B—B.

Operator member 10, which is formed of steel or other suitably elastic substance, is substantially rectangular in shape, but the thickness of member 10 is not uniform throughout its length as can be seen in the view of FIG. 6. Slots 71, 72, 73, 74, 75 and 76 of operator member 10 serve to define a central beam member 50 and a pair of side beam members 30 and 40. The cross-sectional areas of each of beam members 50, 30 and 40 are not uniform throughout their respective lengths. Central beam member 50 is provided with beam portions 51 and 52 and enlarged mid-portion 53. Side beam member 40 is provided with beam portions 41 and 42 and enlarged mid-portion 43. Side beam member 30 is provided with beam portions 31 and 32 and enlarged mid-portion 33.

Beam members 30, 40 and 50 are all of the same length and are mutually connected to end members 21 and 22. In any cross section, taken in a plane parallel to the plane containing axes y and z, the heights of beam members 30, 40 and 50 are equal to each other. Further, in any such cross section, the sum of the widths of beam members 30 and 40 is equal to the width of beam member 50, and width of members 30 and 40 are equal to each other. Therefore, the combination of beam members 30 and 40, acting together as a pair of beams in vertical bending, will together have a stiffness—or rigidity—equal to the bending stiffness of beam member 50.

Figure 5:
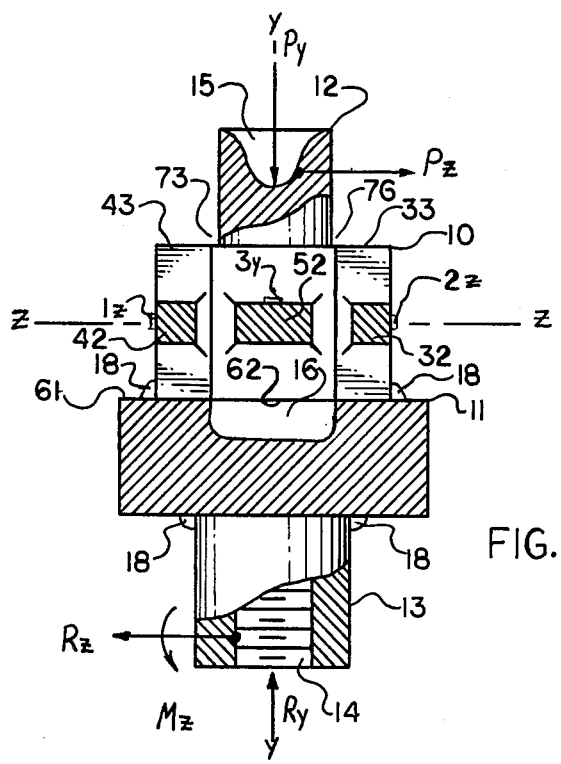
FIG. 5 is a cross-sectional view of the embodiment shown in FIG. 4 taken in the direction of arrows A—A.

As shown in FIGS. 5 and 6, the lower surfaces of mid-portions 33 and 43 of side beam members 30 and 40, respectively, rest on upper surface 61 of base member 11. Base member 11 has its surface 61 relieved to provide clearances 17 and 19 under the lower surfaces 66 and 67 of end members 21 and 22, respectively, and to provide clearance 16 under lower surface 62 of central beam member 50.

Figure 7:
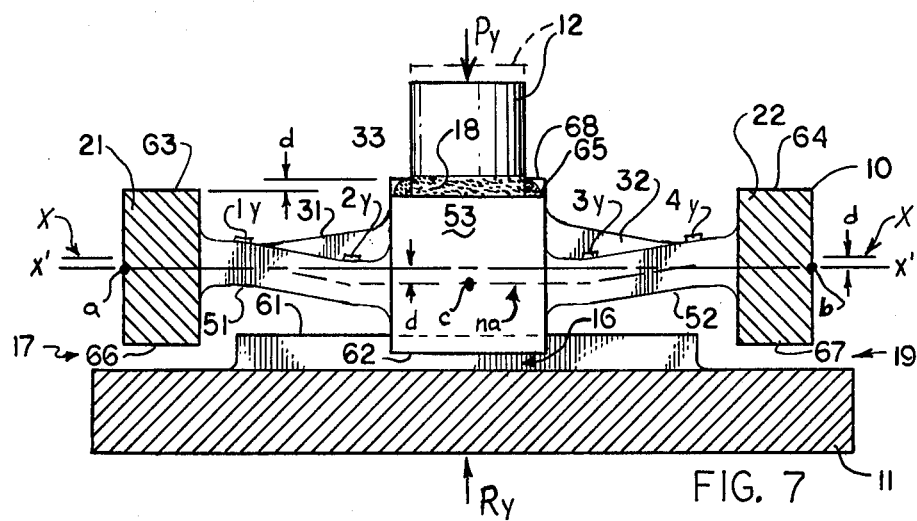
FIG. 7 is a cross-sectional view of the embodiment shown in FIG. 4 taken in the direction of arrows C—C.

The bending characteristics of the operator member 10 can be seen in FIG. 7, where a vertical force Py is being introduced along axis y—y and opposed by reaction force Ry. Reaction force Ry is acting upwardly on base member 11. Base member 11, is in turn, exerting upward forces on operator member 10 through side beam portion 33 (shown) and side beam portion 43 (not shown in FIG. 7). Since the magnitude of upward force Ry is equal to the magnitude of downward force Py, and since the stiffness of the combined side beam members 30 and 40 equals the stiffness of central beam member 50, bending of the side beams 30 and 40 produces downward deflection of some magnitude at the ends and bending of central beam 50 produces an equal magnitude of deflection downward at the mid-span. Specifically, points a and b are displaced downwardly a distance d, so that axis x'—x' is a distance d below original axis x—x. Point c of central beam member 50 is displaced a similar distance d below axis x'—x'.

It can be seen in FIG. 7 that strain gages 1y and 4y are in tension and strain gages 2y and 3y are in compression as a result of bending of the central beam member 50, and the tension and compression are proportional to the magnitude of force Py.

Figure 9:
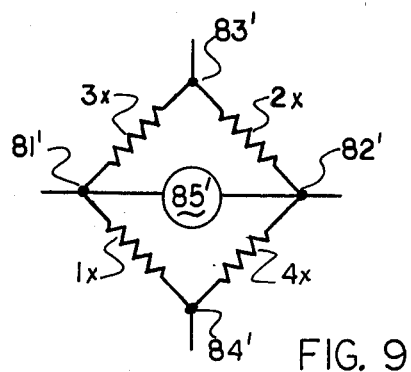
FIG. 9 is a schematic representation of a second Wheatstone bridge incorporating strain gages embodied in the invention shown in FIGS. 4-7.

These strain gages 1y, 2y, 3y and 4y are connected in a Wheatstone bridge circuit, as illustrated in FIG. 9, so that the resistances of gages 1y and 4y increase and the resistances of 2y and 3y decrease proportional to force Py, causing an increased flow of current between output terminals 81 and 82. Any suitable source of current is connected to input terminals 83 and 84, and any suitable indicator means 85, such as an ammeter, may be connected across output terminals 81 and 82. In this case, the indicated reading will be proportional to the magnitude of force Py.

In the event that an extraneous force Px is present, as shown in FIG. 6, it is reacted by force Rx. Reaction force Rx, which is equal to force Px, can only act on the operator member 10 through action of beam portions 33 and 43 of side beams 30 and 40, respectively, introducing forces into end members 21 and 22. This condition of loading subjects all of beam portion 51 to axial tension in the x—x direction, whereby both of strain gages 1y and 2y are in tension. Such tension on strain gage 2y causes an increase in the resistance of gage 2y and electrically offsets—or cancels—the increase in resistance of gage 1y. Similarly, strain gages 3y and 4y are both subjected to compression and will offset each other electrically in the Wheatstone bridge of FIG. 8.

In addition to the reaction force $R_x$ caused by extraneous force Px, a moment Mx is introduced into the structure. By symmetry, moment Mx causes an increased bending action in central beam portion 52 which is accompanied by a corresponding decrease in bending action in central beam portion 51. Increased electrical outputs from strain gages 3y and 4y is thereby offset—or cancelled—by corresponding decreased outputs from strain gages 1y and 2y.

Another extraneous force Pz is shown in FIG. 5, being reacted by force Rz. Reaction force Rz is transmitted to the ends of central beam member 50 through side beam members 30 and 40 and finally through end members 21 and 22. Lateral bending of central beam member 50 occurs, but is not sensed by the strain gages 1y, 2y, 3y and 4y to any significant degree, inasmuch as these gages are in the x-y plane—which is the neutral plane of lateral bending for central beam member 50—and the gages see neither tension nor compression.

Force Pz also causes a moment Mz which creates torsion in central beam member 50. Strain gages 1y, 2y, 3y and 4y are all subjected to the same torsional stress, so that any change in resistance of gages 1y and 4y will be electrically offset by an equal change in resistance of gages 2y and 3y.

Figure 8:
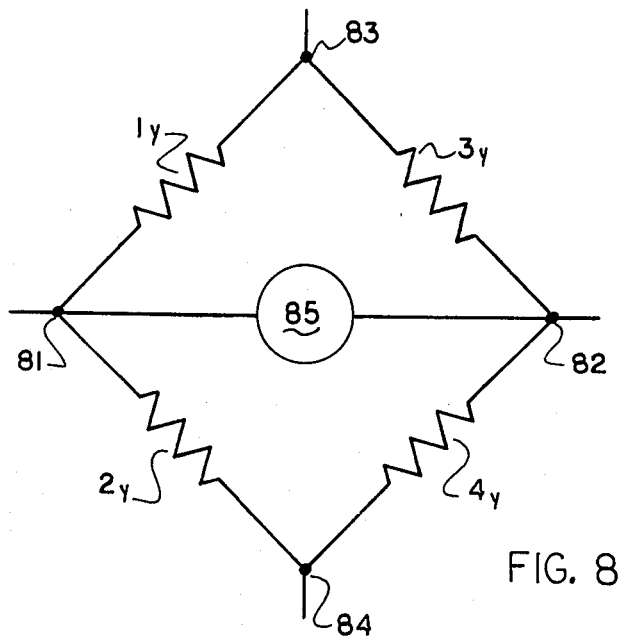
FIG. 8 is a schematic representation of a first Wheatstone bridge incorporating strain gages embodied in the invention shown in FIGS. 4-7.

It can therefore be seen that the output of the load cell through the Wheatstone bridge of FIG. 8 is sensitive to and proportional to force only in the Py direction.

The function of enlarged beam portion 53 in central beam member 50 is to minimize errors in linearity or calibration as a result of attachment of support post 12 by means of welds 18. The rectangular moment of inertia of the cross section through beam portion 53 is extremely large relative to that of beam portions 51 and 52. Referring to FIG. 7, it can be seen that the bending of neutral axis NA is pronounced through the lengths of beam portions 51 and 52, but bending of neutral axis NA is insignificant through the length of relatively enlarged and stiff beam portion 53. Any additional stiffening of beam portion 53 which results from welded attachment of support post 12 can affect the bending of the neutral axis NA only in an area where bending of the neutral axis is already insignificant. Further, the introduction of input forces into a rigidized portion of the central beam substantially eliminates potentially erroneous deformation or flexure of the beam in the local area of input of concentrated forces.

Now referring to strain gages 1x, 2x, 3x and 4x of FIG. 4, horizontal force Px and moment Mx of FIG. 6, and the Wheatstone bridge of FIG. 9, a force Px which is along or parallel to axis x—x can be measured independently of force vectors in the y—y or z—z directions.

First considering the axial forces parallel to axis x—x, input force Px is reacted by force Rx. Reaction force Rx is introduced into the operator member through beam portions 33 and 43 of beam members 30 and 40, respectively. Part of the input force Px is transmitted from central beam member 50 through end member 21 as axial compression forces acting on side beam portions 31 and 41. Strain gages 1x and 2x are subjected to compression, causing a corresponding reduction in electrical resistance of the two gages. Strain gages 3x and 4x are simultaneously subjected to tension, causing a corresponding increase in electrical resistance in these two gages. Such changes in resistances in the Wheatstone bridge of FIG. 9 cause an increase in current flow between output terminals 81' and 82' and a reading is indicated by a suitable instrument 85'. Input terminals 83' and 84' are, naturally, connected to a suitable source of current.

Moment Mx causes vertical bending of side beam portions 31, 32, 33 and 34. By symmetry, bending of portions 31 and 41 will be of equal magnitude but of opposite direction to bending portions 32 and 42. Therefore, any increase in the Wheatstone output caused by increased bending at gages 3x and 4x will be accompanied by a decreased bending at gages 1x and 2x, so that total bridge electrical output will be unaffected.

Any force Py causes each of gages 1x, 2x, 3x and 4x to be subjected to tension which, in the Wheatstone bridge of FIG. 9, will be cancelled out.

Any force Pz, as shown in FIG. 5, causes lateral bending of beam portions 31, 32, 41 and 43. Strain gages 1x, 2x, 3x and 4x are each mounted above the center line—or neutral axis for lateral bending—of their corresponding beam portions. Therefore, gages 1x, 2x, 3x and 4x are attached in the neutral plane of lateral bending and these gages will be substantially unaffected by lateral force Pz.

The moment Mz, caused by Pz in FIG. 5, produces downward bending of beam member 30 and upward bending of beam member 40. Strain gage 2x, normally a compression gage for measuring force Px, and gage 4x, normally a tension gage, are both subjected to tension by downward deflection of beam member 30. Therefore, the outputs of gages 2x and 4x cancel each other. Similarly, gages 1x and 3x are both subjected to compression by upward bending of beam member 40, and outputs of these two gages will cancel each other.

It can be seen from the foregoing that output of the Wheatstone bridge of FIG. 9 generates a signal proportional only to force Px and such output is substantially unaffected by forces Py and Pz or moments Mx or Mz.

Figure 10:
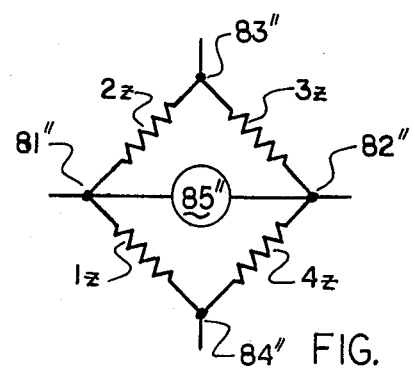
FIG. 10 is a schematic representation of a third Wheatstone bridge incorporating strain gages embodied in the invention shown in FIGS. 4-7.

Next referring to strain gages 1z, 2z, 3z and 4z of FIG. 4, horizontal force Pz and moment Mz of FIG. 5, and the Wheatstone bridge of FIG. 10, a force Pz which is along or parallel to axis z—z can be measured independently of force vectors in the y—y or x—x direction.

Lateral force Pz causes lateral bending, in the direction of axis z—z, and causes gages 1z and 3z to be subjected to compression. Similarly, gages 2z and 4z are subjected to compression. In the previously described function of a Wheatstone bridge, the bridge output of FIG. 10 will in this case cause a signal to be indicated by instrument 85" across terminals 81" and 82". Terminals 83" and 84" are input terminals. The bridge output which results from lateral bending of beam portions 31, 32, 41 and 42 is proportional only to force Pz.

Vertical bending of beam member 30 and 40 has substantially no effect on strain gages 1z, 2z, 3z and 4z. As seen in FIG. 5, these gages are attached to the operator member in the x—z plane, which is the neutral plane for vertical bending.

Measurement of force Pz is also unaffected by axial forces resulting from input force Px. As previously described, a force Px causes axial (x—x) compression in beam portions 31 and 41. Strain gage 1z, a compression gage, and strain gage 2z, a tension gage, are both subjected to compression as a result of force Px, and output of gages 1z and 2z cancel each other, Similarly, gages 3z and 4z are both subjected to tension, and their outputs cancel each other.

From the foregoing disclosure, it is readily apparent that this embodiment of the invention provides a means and method for measuring force vectors in each of three directions, where the measurement of individual force vectors are mutually independent of each other.

It should be noted that each of the force vectors Px and Pz are shown in the Figures as being parallel to but displaced from axes x—x and z—z, respectively, but the vertical distance of displacements are not defined. Distance of vertical displacement between force Px and axis x—x, and between force Pz and axis z—z, are inconsequential, because the distances only affect the magnitude of moments Mx and Mz, which are substantially ignored in the measurement function.

While force Py is shown in all Figures to be along axis y—y, displacement of force Py to a position removed from but parallel to axis y—y would cause no substantial change in measured value of force Py. Such displacement would cause a moment Mx and/or Mz, depending on direction of displacement, but it has already been shown that such moments do not affect measurement of force Py.

It is therefore, also apparent that the location or locations at which input force vectors enter the structure of this embodiment of the invention are not critical, provided that all forces entering the structure are introduced into the operator member 10 through the appropriate rigidized beam portions 33, 43 and 53.

Finally, it is apparent that introduction of reaction force Ry into the side beam members 30 and 40 is accomplished in a manner that does not create significant torsional forces in members 30 and 40.

Figure 11:
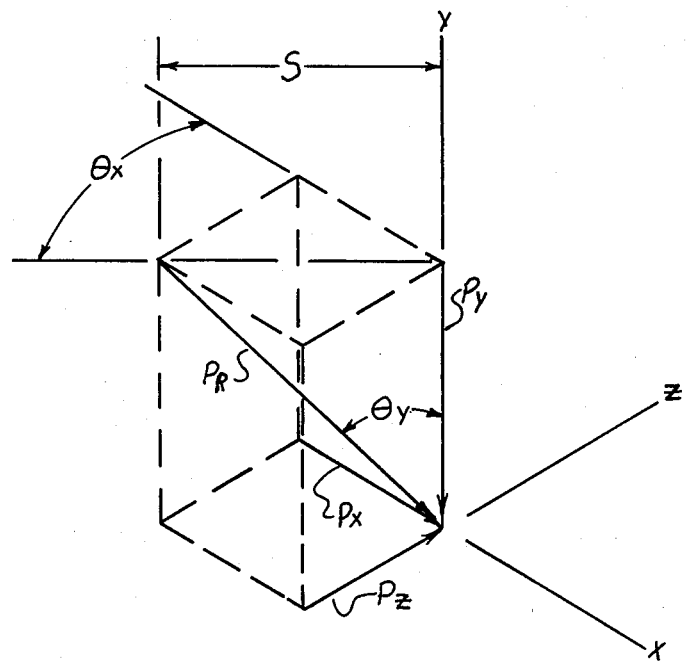
FIG. 11 is an isometric diagram of a three-dimensional force vector.

It is also apparent that simultaneous, but independent, measurement of force vectors Py, Px and Pz enables computation of a resultant force in terms of magnitude and direction. FIG. 11 shows an isometric diagram of three force vectors and one resultant force $P_R$. By calibrating the outputs of the Wheatstone bridges shown in FIGS. 8, 9 and 10, so that indicated magnitude of forces Px, Pz and Py are in the same force units, the following equations apply:

$$\tan \theta_x = Pz/Px$$
$$S = \sqrt{Px^2 + Pz^2}$$
$$\tan \theta_y = S/Py$$
$$P = \sqrt{S^2 + Py^2}$$

All of input forces Py, Px and Pz have been shown in the figures in directions arbitrarily established as the directions of positive, or plus, values. Reversal of any force direction as, for example, directing force Px of FIG. 5 to the left instead of to the right as shown would cause a corresponding reversal of the polarity of electrical output of the connected Wheatstone bridge and a corresponding indication of a force identified as being in the negative direction.

Having described my invention, I claim:

1. A load cell including: a substantially rectangular operator member having a central beam member, a pair of bearing beam members spaced from and parallel to said central beam member, the central portion of said central beam member being relatively thickened to provide an integral rigid load receiving portion, the central portion of each of said bearing beam members being thickened to provide a pair of integral rigid support portions, and a pair of end members connecting the outermost ends of the central beam member to the outermost ends of the bearing beam members, all of said beam portions other than said thickened portions being planar so that load forces and support forces are introduced into the operator member at locations spaced from the planar portions of said operator member; and a plurality of independent sets of strain gauges secured to said operator member and electrically connected in Wheatstone bridge circuits to measure vectors in a plurality of directions resulting from a force applied to said central portion of said central beam member.

2. A load cell according to claim 1 including three independent sets of strain gauges to measure force vectors in three directions resulting from a force applied to said central portion of the central beam member.

3. A load cell including: a substantially rectangular operator member having a central beam member, a pair of bearing beam members spaced from and parallel to said central beam member, the central portion of said central beam member being relatively thickened to provide an integral rigid load receiving portion, the central portion of each of said bearing beam members being thickened to provide a pair of integral rigid support portions, and a pair of end members connecting the outermost ends of the central beam member to the outermost ends of the bearing beam members, all of said beam portions other than said thickened portions being planar so that load forces and support forces are introduced into the operator member at locations spaced from the planar portions of said operator member, means secured to said operator member for measuring the deflection of said operator member proportional to the forces applied to the operator member, a receptacle to serve as a receiver member for the jack point of an aircraft and transfer forces from the jack point into the operator member, said receiver member being welded to the load receiving portion of said central beam member at a location more distant from the neutral axis of the operator member than are the measuring means.

4. A load cell for weighing aircraft including: a substantially rectangular operator member having a central beam member, a pair of bearing beam members spaced from and parallel to said central beam member, the central portion of said central beam member being relatively thickened to provide an integral rigid load receiving portion, the central portion of each of said bearing beam members being thickened to provide a pair of integral rigid support portions, and a pair of end members connecting the outermost ends of the central beam member to the outermost ends of the bearing beam members, all of said beam portions other than said thickened portions being planar so that load forces and support forces are introduced into the operator member at locations spaced from the planar portions of said operator member; and three independent sets of strain gauges secured to said operator member and electrically connected in Wheatstone bridge circuits to measure force vectors in three directions resulting from a force applied to said central portion of said central beam member.

* * * * *